(12) United States Patent
Basseen et al.

(10) Patent No.: US 6,712,885 B1
(45) Date of Patent: Mar. 30, 2004

(54) SILOXANE REMOVAL SYSTEM

(75) Inventors: Sanjiv K. Basseen, Oak Ridge, TN (US); Rame Sulaiman, Knoxville, TN (US)

(73) Assignee: Pioneer Air Systems, Inc., Wartburg, TN (US)

( * ) Notice: Subject to any disclaimer, the term of this patent is extended or adjusted under 35 U.S.C. 154(b) by 0 days.

(21) Appl. No.: 10/235,779

(22) Filed: Sep. 5, 2002

(51) Int. Cl.$^7$ .............................................. B01D 35/18
(52) U.S. Cl. ..................... 95/288; 55/282.5; 55/482.1; 62/80; 62/151; 95/20; 95/39; 96/400; 96/405
(58) Field of Search ............................... 95/19, 20, 39, 95/288; 96/400, 405; 55/282.5, 482.1, DIG. 15; 62/80–82, 617–619, 151

(56) References Cited

U.S. PATENT DOCUMENTS

| | | | | |
|---|---|---|---|---|
| 3,331,213 A | * | 7/1967 | Harmens ...................... | 62/639 |
| 3,349,571 A | * | 10/1967 | Nebgen ........................ | 62/619 |
| 4,638,852 A | * | 1/1987 | Basseen et al. ............... | 165/47 |
| 4,761,968 A | * | 8/1988 | Basseen et al. ............... | 62/271 |
| 5,107,919 A | * | 4/1992 | Basseen et al. ............... | 165/47 |
| 5,207,895 A | * | 5/1993 | Basseen et al. ............... | 210/95 |
| 5,467,722 A | * | 11/1995 | Meratla ....................... | 110/345 |
| 5,476,536 A | * | 12/1995 | Holter ........................... | 95/42 |
| 5,512,084 A | * | 4/1996 | Mauterer ..................... | 95/199 |
| 5,529,612 A | | 6/1996 | Troost .......................... | 95/184 |
| 5,562,754 A | * | 10/1996 | Kang et al. ................... | 95/54 |
| 5,935,298 A | * | 8/1999 | Prasad et al. ................. | 95/39 |

FOREIGN PATENT DOCUMENTS

JP 62-279827 * 12/1987 ................. 95/288

OTHER PUBLICATIONS

Wheless, E. et al., Siloxanes in Landfill and Digester Gas, Los Angeles County Sanitation Districts, Whittier, California, 2002.

* cited by examiner

Primary Examiner—Richard L. Chiesa
(74) Attorney, Agent, or Firm—Pitts & Brittian, P.C.

(57) ABSTRACT

A method and apparatus for continuously removing siloxanes and $H_2O$ from a waste gas stream containing $H_2O$ and siloxanes includes cooling the waste gas stream in a primary heat exchanger to a temperature of greater than 2° F. to condense a portion of the $H_2O$ from the waste gas stream, chilling the waste gas stream in a first gas-refrigerant heat exchanger to a temperature of about −20° F. to condense the siloxanes and freeze the $H_2O$ and then directing the cooled waste gas stream from the primary heat exchanger to a second gas-refrigerant heat exchanger while the first gas-refrigerant heat exchanger is defrosted to remove frozen $H_2O$ and siloxanes.

10 Claims, 1 Drawing Sheet

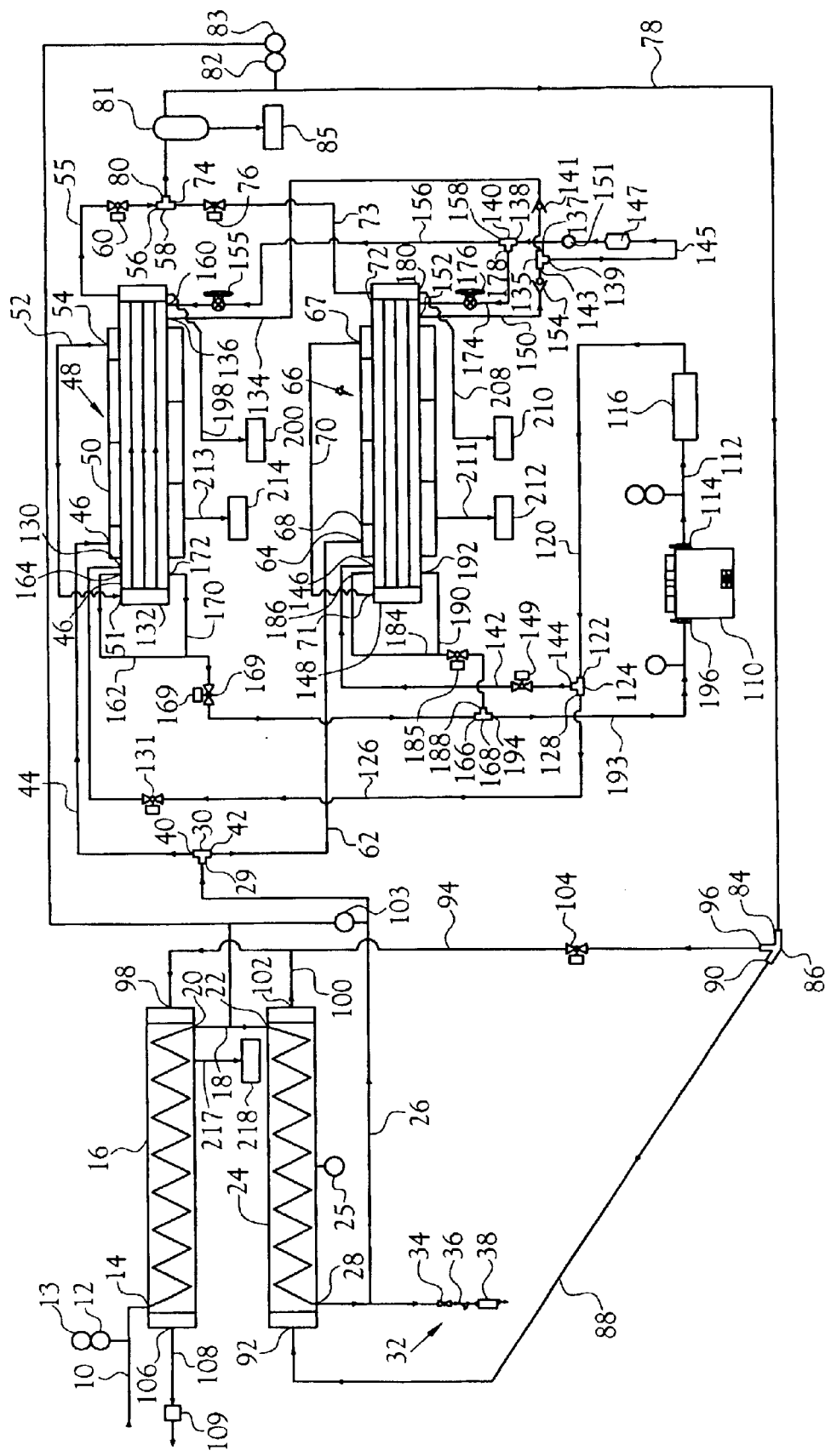
Figure

SILOXANE REMOVAL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to the removal of siloxanes from a waste gas stream containing siloxanes and $H_2O$.

More particularly, this invention pertains to a system for sequentially removing first $H_2O$ in a primary heat exchanger and then $H_2O$ and siloxanes in alternating gas-refrigerant heat exchangers to provide continuous removal of siloxanes from a waste gas stream.

A secondary benefit of the invention is the significant reduction in the amount of numerous other contaminants e.g. hydrogen sulfide, sulfur dioxide, halogens, volatile organic compounds (VOC), etc., commonly present in the waste gas stream. Washing of the gas and solubility of the contaminants in the condensed moisture, as well as the attraction between neighboring atoms by van der waals forces cleanse the gas even more and convert it into a useful "green energy source."

2. Description of the Related Art

Landfills and digesters generate substantial amounts of waste gas streams containing methane. It is desirable to use this methane as fuel for boilers, turbines and other energy sources, particularly in contrast to allowing it to escape into the atmosphere, where it exacerbates the "greenhouse effect." Unfortunately, the waste gas streams collected from landfills and digesters also contain various other organic compounds, some of which are quite damaging to the boilers, combustion engines, turbines and the systems used to treat the exhaust gases generated upon burning the waste gas.

One family of compounds that has proven to be particularly troublesome when burning waste gases is siloxanes, cyclic organic silicon monomers. Siloxanes are widely used as dispersion agents in various consumer products, including deodorants, shampoos and shaving cream. In addition, siloxanes are used in a variety of industrial applications and are periodically discharged in wastewater. Accordingly, it is quite common for siloxanes to be found in landfills and wastewater.

Siloxanes are frequently volatile, having a dew point of about −9° F., and therefore the waste gas streams from landfills and digesters generally contain siloxanes. When the waste gas is burned, the silicon contained in the siloxanes is deposited on the turbine and engine parts or boiler tubes, for example, reducing the efficiency of the energy generating equipment. In addition, the selective catalytic reduction equipment used to remove NOx is particularly sensitive to fouling by silicon.

Various efforts have been made to remove siloxanes from the waste gas streams prior to burning. For example, activated carbon filters have been used, but the activated carbon must be regenerated periodically in a kiln. Filtering resins and collection in methanol and tetraglyme have also been used. Costs have been prohibitive and regeneration of the resins has proven to be quite difficult.

It has been recognized that cooling a waste gas stream to a temperature of −10° to −20° F. results in substantially complete removal of siloxanes from a waste gas stream. Ed Wheless and Dan Gary, Siloxanes in Landfill And Digester Gas, 25th Annual Landfill Symposium, Solid Waste Association of North America, 2002. However, chilling the raw waste gas below the freezing temperature of water rapidly clogs the heat exchanger tubes with frozen condensate.

It is an object of the present invention to provide a cost effective system for removing $H_2O$, siloxanes and other substances soluble in the condensate from waste gas streams.

It is also an object of the present invention to provide a system for continuously removing $H_2O$, siloxanes and other substances soluble in the condensate from waste gas streams.

BRIEF SUMMARY OF THE INVENTION

According to one embodiment of the present invention, a waste gas stream, which may have a temperature as high as 300° F., is directed to a primary gas-to-gas heat exchanger, whereby the waste gas is chilled to a temperature close to, but above, 32° F., to condense a substantial portion of the $H_2O$ carried in the waste gas stream. The condensing $H_2O$ also collects a portion of other impurities in the waste gas, including siloxanes. The cooled waste gas is then directed to a first of two gas-refrigerant heat exchangers, whereby the temperature of the waste gas is reduced to about −20° F. Within the first gas-refrigerant heat exchanger, the remaining $H_2O$ and the siloxanes are condensed and removed. Over time, the frozen $H_2O$ begins to block the passage of waste gas through the first gas-refrigerant heat exchanger. Before a substantial blockage occurs, the chilled waste gas stream is diverted to a second gas-refrigerant heat exchanger operating in substantially the same manner as the first gas-refrigerant heat exchanger. Simultaneously, the first gas-refrigerant heat exchanger is defrosted using a defrosting fluid, e.g. a refrigerant, to remove the frozen $H_2O$ and collected siloxanes. The first and second gas-refrigerant heat exchangers alternate between freezing and defrosting cycles to provide continuous removal of $H_2O$ and siloxanes from the waste gas stream.

The cleansed and dry waste gas stream alternatingly exits either of the first or second gas-refrigerant heat exchanger at a temperature of about −20° F. and is used as the coolant gas for the primary gas-gas heat exchanger that provides initial cooling of the waste gas, prior to discharge to points of use.

BRIEF DESCRIPTION OF THE SEVERAL VIEWS OF THE DRAWINGS

The above-mentioned features of the invention will become more clearly understood from the following detailed description of the invention read together with the drawings in which:

The FIGURE is a schematic diagram of a system embodying various of the features of the present invention.

DETAILED DESCRIPTION OF THE INVENTION

Referring to the drawings in which like numbers designate like parts there is disclosed a system for continuously removing $H_2O$ and siloxanes from a waste gas stream. An inlet conduit 10, including a temperature indicator 12 and a pressure indicator 13, provides flow communication for a waste gas stream to an inlet 14 of a first gas-gas heat exchanger 16. A conduit 18 provides flow communication for the waste gas stream from an outlet 20 of the first gas-gas heat exchanger 16 to an inlet 22 of a second gas-gas heat exchanger 24. The second gas-gas heat exchanger 24 includes a temperature indicator 25. A conduit 26 provides flow communication for the waste gas stream from an outlet 28 of the second gas-gas heat exchanger 24 to an inlet 29 of a tee 30. A drain assembly 32, comprising an isolation valve 34, a y-strainer 36 and a drain valve 38 extends from the conduit 26.

The tee 30 includes two outlets 40 and 42. A conduit 44 provides flow communication for waste gas from the tee outlet 40 to an inlet 46 to an outer shell 50 of a first gas-refrigerant heat exchanger 48. A conduit 52 provides flow communication for the waste gas stream from an outlet 54 of the outer shell 50 of the first gas-refrigerant heat exchanger 48 to an inlet 51 to an inner shell 132 of the heat exchanger 48. A conduit 55 provides flow communication from an outlet 54 from the inner shell 132 to a first inlet 56 of a tee 58. A valve 60 is located in the conduit 55 to alternately open or close the conduit 55.

A conduit 62 provides flow communication for waste gas from the tee outlet 42 to an inlet 64 to an outer shell 68 of a second gas-refrigerant heat exchanger 66. A conduit 70 provides flow communication for the waste gas stream from an outlet 67 of the outer shell 68 to an inlet 71 to an inner shell 148 of the second gas-refrigerant heat exchanger 66. A conduit 73 provides flow communication for the waste gas stream from an outlet 72 from the inner shell 148 to a second inlet 74 of the tee 58. A valve 76 is located in the conduit 73 to alternately open or close the conduit 73.

A conduit 78, including a cold, 0.1 micron coalescer filter 81, a temperature indicator 82 and a differential pressure switch 83 provides flow communication for waste gas from the tee outlet 80 to an inlet 84 of a tee 86. A drain assembly 85, similar to the drain assembly 32, extends from the cold coalescer filter 81.

A conduit 88 provides flow communication for waste gas from a first tee outlet 90 to a cooling inlet 92 of the second gas-gas heat exchanger 24. A conduit 94 provides flow communication for waste gas from a second tee outlet 96 to a cooling inlet 98 of the first gas-gas heat exchanger 16. A conduit 100 provides flow communication for waste gas from a cooling outlet 102 of the second gas-gas heat exchanger 24 to the conduit 94. A differential pressure switch 103 is located between conduits 18 and 100. A valve 104 is located in the conduit 94 to alternately open or close the conduit 94. A conduit 108 provides flow communication for waste gas from a cooling outlet 108 to a storage, or points of use (not shown). A carbon filter adsorber 109 is included in the conduit 108.

The liquid refrigerant for the gas-refrigerant heat exchangers 48 and 66, which may comprise refrigerant R22, for example, is re-circulated through the heat exchangers 48 and 66 to alternatingly cool and heat the contents of the heat exchangers 48 and 66. It will be recognized by those skilled in the art that indirect cooling, in which another liquid cooled by the refrigerant is circulated through the heat exchangers 48 and 66, may be used instead. A compressor 110 is provided for pressurizing the refrigerant as is known to those skilled in the art. A conduit 112 provides flow communication from an outlet valve 114 to a condenser 116. The condenser 116 may be cooled by air or liquid systems well known in the art.

A conduit 120 provides flow communication from the condenser 116 to an inlet 122 of a tee 124. A conduit 126 provides flow communication from a first outlet 128 to an inlet 130 of the outer shell of the first gas-refrigerant heat exchanger 48. A valve 131 is located in the conduit 126 to alternately open or close the conduit 126. A conduit 134 provides flow communication from an outlet 136 to a first inlet 137 of a tee 135. The conduit 134 includes a check valve 141 to prevent backflow of refrigerant through the conduit 134.

A conduit 142 provides flow communication from a second outlet 144 to an inlet 146 of the outer shell of the second gas-refrigerant heat exchanger 66. A valve 149 is located in the conduit 142 to alternately open or close the conduit 142. A conduit 150 provides flow communication from an outlet 152 to a second inlet 143 of the tee 135. The conduit 150 includes a check valve 154 to prevent backflow of refrigerant through the conduit 134.

A conduit 145 provides flow communication from the outlet 139 of the tee 135 to an inlet 138 of a tee 140. The conduit 145 includes a liquid line filter 147 and a sight glass 151.

A conduit 156, including an expansion valve 155, provides flow communication from a first outlet 158 of the tee 140 to an inlet 160 of the shell of the first gas-refrigerant heat exchanger 48. A conduit 162 provides flow communication from a gas phase outlet 164 of the inner shell of the first gas-refrigerant heat exchanger 48 to a first inlet 166 of a tee 168. A conduit 170 provides flow communication from a liquid phase outlet 172 of the first gas-refrigerant heat exchanger to the conduit 162. A valve 169 is located in the conduit 162 to alternately open or close the conduit 162.

A conduit 174, including an expansion valve 176, provides flow communication from a second outlet 178 of the tee 140 to the inner shell of the second gas-liquid heat exchanger 66. A conduit 184 provides flow communication from a gas phase outlet 186 of the second gas-refrigerant heat exchanger 66 to a second inlet 188 of a tee 168. A conduit 190 provides flow communication from a liquid phase outlet 192 of the second heat exchanger to the conduit 184. A conduit 193 provides flow communication from the outlet 194 of the tee 168 to the inlet valve 196 of the compressor 110.

A condensate conduit 198 extends from the first gas-refrigerant heat exchanger 48 to provide an exit for condensate. A drain assembly 200, substantially similar to the drain assembly 32, extends from the conduit 198.

A condensate conduit 208 extends from the second gas-refrigerant heat exchanger 66 to provide an exit for condensate. A drain assembly 210, substantially similar to the drain assembly 32, extends from the conduit 208.

A condensate conduit 211 extends from the outer shell of the second gas-refrigerant heat exchanger 66 to provide an exit for condensate. A drain assembly 212, substantially similar to the drain assembly 32, extends from the conduit 211.

A condensate conduit 213 extends from the outer shell of the first gas-refrigerant heat exchanger 48 to provide an exit for condensate. A drain assembly 214, substantially similar to the drain assembly 32, extends from the conduit 213.

A condensate conduit 217 extends from the first gas-gas heat exchanger 16 to provide an exit for condensate. A drain assembly 218, substantially similar to the drain assembly 32, extends from the conduit 217.

In operation, waste gas containing $H_2O$, siloxanes and other substances, from a digester or landfill, for example, is directed through the conduit 10 to the inlet 14 of the first gas-gas heat exchanger 16. The waste gas may be at a temperature of up to 300° F., but is typically about 120° F. Within the first gas-gas heat exchanger 16, the waste gas is at a pressure of about 30 psig and enters at a rate of 5 to 10 SCFM. The cooling gas flowing in a direction counter to the incoming waste gas is the fully treated, outgoing, useful waste fuel gas.

Waste gas exiting from the first gas-gas heat exchanger 16 is directed through the conduit 18 to the inlet 22 of the second gas-gas heat exchanger 24, wherein the waste gas temperature is reduced to about 40° F. The cooling gas flowing in a direction counter to the waste gas is the fully treated waste gas. It will be recognized by those skilled in the art that at lower temperatures of incoming waste gas only one gas-gas heat exchanger may be required. The valve 104 controls flow directly from the tee 86 to the inlet 98 of the first gas-gas heat exchanger 16.

Within the first gas-gas heat exchanger 16 and the second gas-gas heat exchanger 24 a substantial portion of the $H_2O$ in the waste is condensed to water and drained through the drain assemblies 32 and 218. The condensed water also removes particulate matter as well as a portion of the siloxanes and other water soluble substances contained in the waste gas.

Waste gas exiting from the second gas-gas heat exchanger 24 is directed through the conduit 26 to the inlet 29 of the tee 30. Initially, the valve 60 is open and the valve 76 is closed to direct the waste gas through the conduit 44 to the inlet 46 of the outer shell 50 of the first gas-refrigerant heat exchanger 48. From the outlet 54 of the outer shell 50, the waste gas flows though the conduit 52 to the inlet 51 and the tubes of the gas-refrigerant heat exchanger 48. Within the first gas-refrigerant heat exchanger 48, the waste gas is cooled to a temperature of about −20° F., below the dew point of siloxanes, to condense for drainage through the drain assembly 200. The flow rate remains at about 10 scfm and the pressure of the exiting waste gas is about 27 psig.

Waste gas exiting from the first gas-refrigerant heat exchanger is directed through the conduit 55, the tee 58 and the conduit 78 to the cold coalescer filter 81 for removal of any remaining siloxanes. The temperature and pressure of the waste gas exiting the cold coalescer filter 81 are monitored by the temperature indicator 82 and the differential pressure switch 83, respectively. The exiting waste gas is preferably at a temperature of −20° F., at a pressure of 26 psig, or higher, and flowing at a rate of about 10 scfm. The waste gas is directed through the conduit 78 to the inlet 84 of the tee 86.

Within the first gas-refrigerant heat exchanger 48, $H_2O$ is condensed and frozen. Most of the moisture is frozen in the outer shell 50, which has a higher capacity to hold frozen condensate. Over a period of time, the waste gas tubes within the first gas-refrigerant heat exchanger 48 become restricted by ice. When the differential pressure switches 83 and/or 103 indicate a pressure drop of greater than 5 psig, for example, a signal is sent to a central controller (not shown). The controller closes the valve 60 and opens the valve 76 to direct the waste gas through the conduit 62 to the inlet 64 of the outer shell 68 of the second gas-refrigerant heat exchanger 48. Alternatively, the controller may be programmed to alternatingly cycle the waste gas at predetermined time intervals through the first gas-refrigerant heat exchanger 48 and the second gas-refrigerant heat exchanger 66.

While the waste gas is processed through the second gas-refrigerant heat exchanger 66 in a manner similar to the first gas-refrigerant heat exchanger 48, the first gas-refrigerant heat exchanger 48 is defrosted as described herein below.

The tee 86 includes a first outlet 90 and a second outlet 96. When the valve 104 is closed, the fully processed waste gas is directed through the conduit 88 to the inlet 92 of the second gas-gas heat exchanger 24, where it cools the incoming waste gas to a temperature of about 40° F. When only one gas-gas heat exchanger is required to cool incoming waste gas the valve 104 is opened to direct the processed waste gas through the conduit 94 to the inlet 98 of the gas-gas heat exchanger 16.

Processed waste exits the first gas-gas heat exchanger 16 at a temperature of about 100° F., a pressure of about 25 psig and at a rate of about 10 scfm.

In operation, the refrigerant cycle begins at the compressor 110, where the refrigerant, such as refrigerant R22 for example, is compressed which increases its pressure and temperature. It is then directed through the conduit 112 to the condenser 116, where the refrigerant is cooled and condensed into liquid to near the temperature of its cooling media e.g. ambient air. Initially, the valve 131 is closed and the valve 149 is open to direct the liquid refrigerant, usually at about 100° F., through the conduit 120, the tee 124 and the conduit 142 to the inlet 146 of the inner shell 148 of the second gas-refrigerant heat exchanger 66. After passage through the second gas-refrigerant heat exchanger 66, where the liquid refrigerant melts the frozen $H_2O$ for exit through the drain systems 210 and 212, the liquid phase of the refrigerant is directed through the outlet 152 and the conduit 150 to the inlet 143 of the tee 135. From the outlet 139 of the tee 135, the liquid refrigerant is directed through the conduit 145 to the inlet 138 of the tee 140. From the outlet 158 of the tee 140, the liquid refrigerant is directed through the conduit 156 and through the expansion valve 155, where the refrigerant expands and its temperature is reduced to about −30° F., and then to the inlet 160 of the inner-shell of the first gas-refrigerant heat exchanger 48. After passage through the inner shell 132 of the first gas-refrigerant heat exchanger 48, the refrigerant is directed through the outlets 164 and 172 and the conduits 162 and 170, respectively to the inlet 166 of the tee 168.

Before the tubes of the first gas-refrigerant heat exchanger 48 become blocked with frozen $H_2O$, as sensed by the pressure differential switches 83 and 103, the valve 169 is closed, the valve 185 is opened, the valve 131 is opened and the valve 149 is closed to direct liquid refrigerant from the tee 124 to the inlet 164 of the inner shell 132 of the first gas-refrigerant heat exchanger 48, where it operates as a defrosting fluid to thaw water previously frozen in the first gas-refrigerant heat exchanger 48.

Using the method and apparatus herein described, a waste gas stream is continuously processed to remove $H_2O$, siloxanes and other soluble substances. One of the first gas-refrigerant heat exchanger or the second gas-refrigerant heat exchanger is defrosted while waste gas is directed to the other of the first gas-refrigerant heat exchanger or the second gas-refrigerant heat exchanger.

From the foregoing description, it will be recognized by those skilled in the art that a novel system for continuously removing siloxanes and $H_2O$ from a waste gas stream has been provided.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An apparatus for removing $H_2O$ and siloxanes from a waste gas stream containing $H_2O$ and siloxanes, said apparatus comprising:
   - a source of waste gas containing $H_2O$ and siloxanes,
   - a primary heat exchanger,
   - a first conduit providing flow communication for said waste gas from said source to said primary heat exchanger,
   - a first gas-refrigerant heat exchanger,
   - a second conduit providing flow communication for said waste gas from said primary heat exchanger to said first gas-refrigerant heat exchanger,
   - a second gas-refrigerant heat exchanger,
   - a third conduit providing flow communication for said waste gas from said primary heat exchanger to said second gas-refrigerant heat exchanger, and
   - a valve for alternating the flow of said waste gas stream between said second conduit and said third conduit.

2. An apparatus as defined in claim 1 and further comprising:
   - a source of defrosting fluid,
   - a fourth conduit providing flow communication for said defrosting fluid from said source of defrosting fluid to said first gas-refrigerant heat exchanger,
   - a fifth conduit providing flow communication for said defrosting fluid from said source of defrosting fluid to said second gas-refrigerant heat exchanger, and
   - a valve for alternating the flow of said waste gas stream between said fourth conduit and said fifth conduit, whereby one of said first gas-refrigerant heat exchanger or said second gas-refrigerant heat exchanger is defrosted while waste gas is directed to the other of said first gas-refrigerant heat exchanger or said second gas-refrigerant heat exchanger.

3. An apparatus as defined in claim 1 wherein said first heat exchanger comprises a gas-gas heat exchanger.

4. An apparatus as defined in claim 3 wherein cooling gas for said gas-gas heat exchanger comprises waste gas exiting from said first gas-refrigerant heat exchanger or said second gas-refrigerant heat exchanger.

5. An apparatus as defined in claim 1 and further comprising a secondary heat exchanger within said second conduit.

6. An apparatus as defined in claim 5 wherein said secondary heat exchanger comprises a gas-gas heat exchanger.

7. An apparatus as defined in claim 6 wherein cooling gas for said secondary gas-gas heat exchanger comprises waste gas exiting from said first gas-refrigerant heat exchanger or said second gas-refrigerant heat exchanger.

8. An apparatus in accordance with claim 1 wherein said gas-refrigerant heat exchanger comprises an inner shell and an outer shell.

9. A method of removing siloxanes from a waste gas stream containing $H_2O$ and siloxanes comprising:
   - cooling said waste gas stream in a primary heat exchanger to a temperature above 32° F. to condense a portion of said $H_2O$ from said waste gas stream,
   - chilling said waste gas stream in a first gas-refrigerant heat exchanger to a temperature of about −20° F. to condense said siloxanes and freeze $H_2O$, and
   - directing said cooled waste gas stream to a second gas-refrigerant heat exchanger while said first gas-refrigerant heat exchanger is defrosted to remove frozen $H_2O$.

10. A method in accordance with claim 9 and further comprising:
    - cooling said primary heat exchanger with said waste gas stream exiting said first gas-refrigerant heat exchanger or said second gas-refrigerant heat exchanger.

* * * * *